(12) United States Patent
Sasaki et al.

(10) Patent No.: US 9,703,458 B2
(45) Date of Patent: Jul. 11, 2017

(54) GENERATING A USER INTERFACE FOR ACTIVATING MULTIPLE APPLICATIONS

(71) Applicant: INTERNATIONAL BUSINESS MACHINES CORPORATION, Armonk, NY (US)

(72) Inventors: Taku Sasaki, Tokyo (JP); Hikaru Tamura, Kawasaki (JP); Yufuko Watanabe, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 14/255,433

(22) Filed: Apr. 17, 2014

(65) Prior Publication Data

US 2014/0337770 A1 Nov. 13, 2014

(30) Foreign Application Priority Data

May 13, 2013 (JP) ................. 2013-101672

(51) Int. Cl.
*G06F 3/048* (2013.01)
*G06F 3/0484* (2013.01)

(52) U.S. Cl.
CPC .................. *G06F 3/0484* (2013.01)

(58) Field of Classification Search
CPC ....................................................... G06F 3/0481
USPC ......................................................... 715/762
See application file for complete search history.

(56) References Cited

U.S. PATENT DOCUMENTS

| 5,897,670 A * | 4/1999 | Nielsen ............... G06F 17/3089 715/804 |
| 6,065,001 A * | 5/2000 | Ohkubo .............. G06F 17/3071 707/700 |
| 8,463,769 B1 * | 6/2013 | Enderton .......... G06F 17/30864 707/713 |
| 2004/0243302 A1 * | 12/2004 | Barry .................. G06Q 20/201 705/20 |
| 2008/0215522 A1 | 9/2008 | Tanaka |
| 2008/0270450 A1 | 10/2008 | Veitch et al. |
| 2014/0006625 A1 * | 1/2014 | Kojima ................. G06F 9/4443 709/226 |

FOREIGN PATENT DOCUMENTS

| CN | 101533400 A | 9/2009 |
| CN | 102087575 A | 6/2011 |
| JP | 11085450 A | 3/1999 |

(Continued)

*Primary Examiner* — Matthew Ell
(74) *Attorney, Agent, or Firm* — Mark G. Edwards

(57) ABSTRACT

An apparatus generates a user interface for activating a plurality of applications. The apparatus comprises: a hardware storage unit adapted to store therein an operation history on a plurality of applications; a generating unit adapted to generate first degree-of-association information indicating a degree of association in a first period among the plurality of applications and second degree-of-association information indicating a degree of association in a second period among the plurality of applications, on a basis of an operation history stored in the hardware storage unit; a hardware receiving unit adapted to receive a designation of any of the first period and the second period; and an arranging unit adapted to arrange the plurality of objects based on their degree-of-association information.

11 Claims, 16 Drawing Sheets

ONE-WEEK DEGREE-OF-ASSOCIATION AVERAGE TABLE

| APPLICATION NAME | | DEGREE OF ASSOCIATION | OPERATION DATE |
|---|---|---|---|
| App1 | App2 | 1.597 | 2012/10/15week |
| App1 | App3 | 1.170 | 2012/10/15week |
| App1 | App4 | 0.340 | 2012/10/15week |
| App2 | App3 | 0.310 | 2012/10/15week |
| App2 | App4 | 0.542 | 2012/10/15week |
| App3 | App4 | 0.195 | 2012/10/15week |
| : | | | |

(56) References Cited

FOREIGN PATENT DOCUMENTS

| | | |
|---|---|---|
| JP | 2001056727 A | 2/2001 |
| JP | 2001350793 A | 12/2001 |
| JP | 2003044193 A | 2/2003 |
| JP | 2005204257 A | 7/2005 |
| JP | 2006344018 A | 12/2006 |
| JP | 2007040791 A | 2/2007 |
| JP | 2010055144 A | 3/2010 |
| JP | 2010-092116 | 4/2010 |
| JP | 2010092116 A | 4/2010 |
| JP | 2010108331 A | 5/2010 |
| JP | 2012064129 A | 3/2012 |
| JP | 2013003788 A | 1/2013 |
| WO | 2006057356 | 6/2006 |

\* cited by examiner

| OPERATION HISTORY TABLE | | | |
|---|---|---|---|
| APPLICATION NAME | OPERATION EVENT | CONTENT | OPERATION TIME |
| App1 | MOUSE | Content1 | 2012/10/15 Mon 9:50:04 |
| App2 | MOUSE | Content2 | 2012/10/15 Mon 10:02:04 |
| App1 | MOUSE | Content1 | 2012/10/15 Mon 10:15:04 |
| App4 | MOUSE | Content4 | 2012/10/15 Mon 11:30:04 |
| App1 | MOUSE | Content1 | 2012/10/15 Mon 12:05:04 |
| App1 | Copy | Content1 | 2012/10/15 Mon 12:10:04 |
| App2 | MOUSE | Content2 | 2012/10/15 Mon 12:10:10 |
| App2 | Paste | Content2 | 2012/10/15 Mon 12:12:03 |
| App3 | MOUSE | Content3 | 2012/10/15 Mon 13:10:02 |
| App1 | MOUSE | Content1 | 2012/10/15 Mon 13:12:01 |
| App2 | Copy | Content2 | 2012/10/15 Mon 13:15:05 |
| App1 | MOUSE | Content1 | 2012/10/15 Mon 13:17:00 |
| App1 | Paste | Content1 | 2012/10/15 Mon 13:17:07 |
| App3 | MOUSE | Content3 | 2012/10/15 Mon 13:20:10 |
| App3 | Paste | Content3 | 2012/10/15 Mon 13:21:10 |
| ⋮ | | | |

FIG. 3

| SWITCHING INTERVAL TABLE | | |
| --- | --- | --- |
| APPLICATION NAME | SWITCHING INTERVAL | OPERATION DATE |
| App1 App2 | 00:12:00 | 2012/10/15 |
| App1 App2 | 00:13:00 | 2012/10/15 |
| App1 App4 | 01:15:00 | 2012/10/15 |
| App1 App4 | 00:35:00 | 2012/10/15 |
| App1 App2 | 00:00:06 | 2012/10/15 |
| App2 App3 | 00:xx:xx | 2012/10/15 |
| : | | |

FIG. 4

| WEIGHT OPERATION TABLE | | |
|---|---|---|
| APPLICATION NAME | OPERATION TIME | OPERATION DATE |
| App1 App2 | 12:10:04 12:12:03 | 2012/10/15 |
| App1 App2 | 13:15:05 13:17:07 | 2012/10/15 |
| App2 App3 | 13:15:05 13:21:10 | 2012/10/15 |
| ⋮ | | |

FIG. 5

OPERATION NUMBER-OF-TIMES TABLE

| APPLICATION NAME | NUMBER OF TIMES OF OPERATION | OPERATION DATE |
|---|---|---|
| App1 | 156 | 2012/10/15 |
| App2 | 120 | 2012/10/15 |
| App3 | 92 | 2012/10/15 |
| : | | |

FIG. 6

| DEGREE-OF-ASSOCIATION TABLE | | |
|---|---|---|
| APPLICATION NAME | DEGREE OF ASSOCIATION | OPERATION DATE |
| App1 App2 | 1.958 | 2012/10/15 |
| App1 App3 | 1.542 | 2012/10/15 |
| App1 App4 | 0.213 | 2012/10/15 |
| App2 App3 | 0.385 | 2012/10/15 |
| App2 App4 | 0.542 | 2012/10/15 |
| App3 App4 | 0.221 | 2012/10/15 |
| ⋮ | | |

FIG. 7

| ONE-WEEK DEGREE-OF-ASSOCIATION TABLE | | |
|---|---|---|
| APPLICATION NAME | DEGREE OF ASSOCIATION | OPERATION DATE |
| App1 App2 | 1.958 | 2012/10/15 |
| App1 App3 | 1.542 | 2012/10/15 |
| App1 App4 | 0.213 | 2012/10/15 |
| App2 App3 | 0.385 | 2012/10/15 |
| App2 App4 | 0.542 | 2012/10/15 |
| App3 App4 | 0.221 | 2012/10/15 |
| ⋮ | | |
| App1 App2 | 1.475 | 2012/10/16 |
| App1 App3 | 1.128 | 2012/10/16 |
| App1 App4 | 0.119 | 2012/10/16 |
| App2 App3 | 0.246 | 2012/10/16 |
| App2 App4 | 0.500 | 2012/10/16 |
| App3 App4 | 0.230 | 2012/10/16 |
| ⋮ | | |
| App1 App2 | 1.358 | 2012/10/21 |
| App1 App3 | 0.842 | 2012/10/21 |
| App1 App4 | 0.513 | 2012/10/21 |
| App2 App3 | 0.285 | 2012/10/21 |
| App2 App4 | 0.342 | 2012/10/21 |
| App3 App4 | 0.121 | 2012/10/21 |

FIG. 8

| ONE-WEEK DEGREE-OF-ASSOCIATION AVERAGE TABLE | | |
|---|---|---|
| APPLICATION NAME | DEGREE OF ASSOCIATION | OPERATION DATE |
| App1 App2 | 1.597 | 2012/10/15week |
| App1 App3 | 1.170 | 2012/10/15week |
| App1 App4 | 0.340 | 2012/10/15week |
| App2 App3 | 0.310 | 2012/10/15week |
| App2 App4 | 0.542 | 2012/10/15week |
| App3 App4 | 0.195 | 2012/10/15week |
| ⋮ | | |

FIG. 9

| ONE-WEEK DEGREE-OF-ASSOCIATION HIGH RANKING TABLE | | |
| --- | --- | --- |
| APPLICATION NAME | DEGREE OF ASSOCIATION | OPERATION DATE |
| App1 App2 | 1.597 | 2012/10/15week |
| App1 App3 | 1.170 | 2012/10/15week |
| App2 App4 | 0.542 | 2012/10/15week |
| App1 App4 | 0.340 | 2012/10/15week |
| App2 App3 | 0.310 | 2012/10/15week |
| App3 App4 | 0.195 | 2012/10/15week |
| ⋮ | | |

FIG. 10

| DEGREE-OF-ASSOCIATION HIGH RANKING TABLE | | |
| --- | --- | --- |
| APPLICATION NAME | DEGREE OF ASSOCIATION | OPERATION DATE |
| App1 App2 | 1.597 | 2012/10/15week |
| App1 App3 | 1.170 | 2012/10/15week |
| App2 App4 | 0.542 | 2012/10/15week |
| App1 App4 | 0.340 | 2012/10/15week |
| App2 App3 | 0.310 | 2012/10/15week |
| App3 App4 | 0.195 | 2012/10/15week |
| ⋮ | | |
| App1 App11 | 1.068 | 18TH OF EVERY MONTH |
| App2 App12 | 0.927 | 18TH OF EVERY MONTH |
| App3 App13 | 0.841 | 18TH OF EVERY MONTH |
| ⋮ | | |

FIG. 11

GENERATING A USER INTERFACE FOR ACTIVATING MULTIPLE APPLICATIONS

BACKGROUND

The present invention relates to an apparatus and a method for generating a user interface. In particular, the present invention relates to an apparatus and a method for generating a user interface for activating a plurality of applications.

In recent years, the quantity of operations necessary to perform in daily work is large, and most of the operations are performed using applications. Under the circumstances, a method for integrating GUIs of a plurality of applications has been proposed in the past.

Previous prior art discloses a GUI integrating method including: automatically acquiring respective operation logs of applications; performing operation log analysis for finding GUI parts that deal with data items common among the applications, from the acquired operation logs; integrating the GUI parts that deal with the common data items; and generating a new integrated GUI that enables the unification of inputs to the plurality of applications.

Meanwhile, other prior art presents a technique for visualizing the degree of association among documents, among contents, and the like has also been known, although the technique is not used to integrate GUIs of a plurality of applications.

Other prior art discloses a technique for displaying access symbols in the following manner. That is, a plurality of concentric circles are set so as to be centered at a particular access symbol selected from a plurality of access symbols (access symbols of information including documents, figures, and images) associated in advance. On the basis of the degree of association with information of the particular access symbol, other grouped access symbols are each located on a circle closer to the center of the concentric circles, as the degree of association thereof is higher. Access symbols on the same circle are located so as to be closer to each other on the same circle, as the degree of association of information therebetween is higher.

Other prior art discloses a technique including: classifying and calculating, for each content, a plurality of content operation histories from event information of an application or an OS generated at the time of a content operation by a user; integrating content operation histories of contents whose operation types are different from each other; calculating a uniform degree of operation for all the contents; dynamically calculating the degree of association among the contents from the similarity in quantity of operation among the contents using the calculated degree of operation and the similarity in access time among the contents; and visualizing the degree of association among the contents.

As described above, a technique for integrating GUIs of a plurality of applications and a technique for visualizing the degree of association among documents, among contents, and the like have already existed.

Unfortunately, up to now, a technique for generating a user interface for activating a plurality of applications on the basis of the degree of association among the applications has not explicitly existed, and a technique for designating the degree of association in which period is used at the time of generating such a user interface has not existed.

SUMMARY

In one embodiment of the present invention, an apparatus generates a user interface for activating a plurality of applications. The apparatus comprises: a hardware storage unit adapted to store therein an operation history on a plurality of applications; a generating unit adapted to generate first degree-of-association information indicating a degree of association in a first period among the plurality of applications and second degree-of-association information indicating a degree of association in a second period among the plurality of applications, on a basis of an operation history stored in the hardware storage unit; a hardware receiving unit adapted to receive a designation of any of the first period and the second period; and an arranging unit adapted to: arrange, in response to the hardware receiving unit receiving the designation of the first period, a plurality of objects respectively operated at a time of activating the plurality of applications onto the user interface on a basis of the first degree-of-association information, and arrange, in response to the hardware receiving unit receiving the designation of the second period, the plurality of objects onto the user interface on a basis of the second degree-of association information.

In one embodiment of the present invention, an apparatus generates a user interface for activating a plurality of applications. The apparatus comprises: a hardware storing unit adapted to store therein an operation history on a plurality of applications; a generating unit adapted to generate first degree-of-association information indicating a degree of association in a predetermined period among the plurality of applications and second degree-of-association information indicating a degree of association on a predetermined day within the predetermined period among the plurality of applications, on a basis of the operation history stored in the hardware storing unit; a hardware receiving unit adapted to receive any of first designation and second designation in a case of activation on the predetermined day, the first designation designating generation of the user interface that has been predetermined to be suitable to the predetermined day and is also compatible with the predetermined period, the second designation designating generation of the user interface that has been predetermined to be suitable to only the predetermined day; and an arranging unit adapted to: arrange, in response to the hardware receiving unit receiving the designation of the first period, a plurality of objects respectively operated at a time of activating the plurality of applications onto the user interface on a basis of the first degree-of-association information, and arrange, in response to the hardware receiving unit receiving the designation of the second period, the plurality of objects onto the user interface on a basis of the second degree-of-association information.

In one embodiment of the present invention, a computer program product generates a user interface for activating a plurality of applications, the computer program product comprising a computer readable storage medium having program code embodied therewith, the program code readable and executable by a processor to perform a method comprising: storing an operation history on the plurality of applications, into a storing unit; generating first degree-of-association information indicating a degree of association in a predetermined period among the plurality of applications and second degree-of-association information indicating a degree of association on a predetermined day within the predetermined period among the plurality of applications, on a basis of the operation history stored in the storing unit; receiving any of first designation and second designation in a case of activation on the predetermined day, the first designation designating generation of the user interface that is suitable to the predetermined day and is also compatible with the predetermined period, the second designation designating generation of the user interface that is suitable to only the predetermined day; and arranging, in a case where the designation of the first period is received, a plurality of objects respectively operated at a time of activating the plurality of applications, onto the user interface on a basis of the first degree-of-association information and the second degree-of-association information, and arranging, in a case where the designation of the second period is received, the plurality of objects onto the user interface on a basis of the second degree-of-association information.

BRIEF DESCRIPTION OF THE SEVERAL VIEWS OF THE DRAWINGS

FIG. 3 is a diagram illustrating an example of an operation history table used in the present embodiment;

FIG. 4 is a diagram illustrating an example of a switching interval table generated in the present embodiment;

FIG. 5 is a diagram illustrating an example of a weight operation table generated in the present embodiment;

FIG. 6 is a diagram illustrating an example of an operation number-of-times table generated in the present embodiment;

FIG. 7 is a diagram illustrating an example of a degree-of-association table generated in the present embodiment;

FIG. 8 is a diagram illustrating an example of a one-week degree-of-association table generated in the present embodiment;

FIG. 9 is a diagram illustrating an example of a one-week degree-of-association average table generated in the present embodiment;

FIG. 10 is a diagram illustrating an example of a one-week degree-of-association high ranking table generated in the present embodiment;

FIG. 11 is a diagram illustrating an example of a degree-of-association high ranking table generated in the present embodiment;

DETAILED DESCRIPTION

Hereinafter, an embodiment of the present invention is described in detail with reference to the attached drawings.

Considering an actual situation of work, there are a large number of operations performed by activating similar applications on a daily basis, and hence such operations may be forgotten. Meanwhile, there are also applications used on only a predetermined day (for example, the end of every month), and hence an operation performed by activating such applications is particularly likely to be forgotten.

In view of the above, the present embodiment provides a launcher obtained by: recording a user's operation history on a plurality of applications; analyzing the frequency of use for each date and time and the association among the applications; and displaying an application association diagram according to the date and time. This enables the user to visually understand an application having a high frequency of use in his/her work, so that the efficiency of the work can be improved. Further, an application for work that occurs on only a predetermined day and thus tends to be forgotten by the user is additionally displayed, and only such an application is displayed, which can remind the user of the work.

Figure 1:
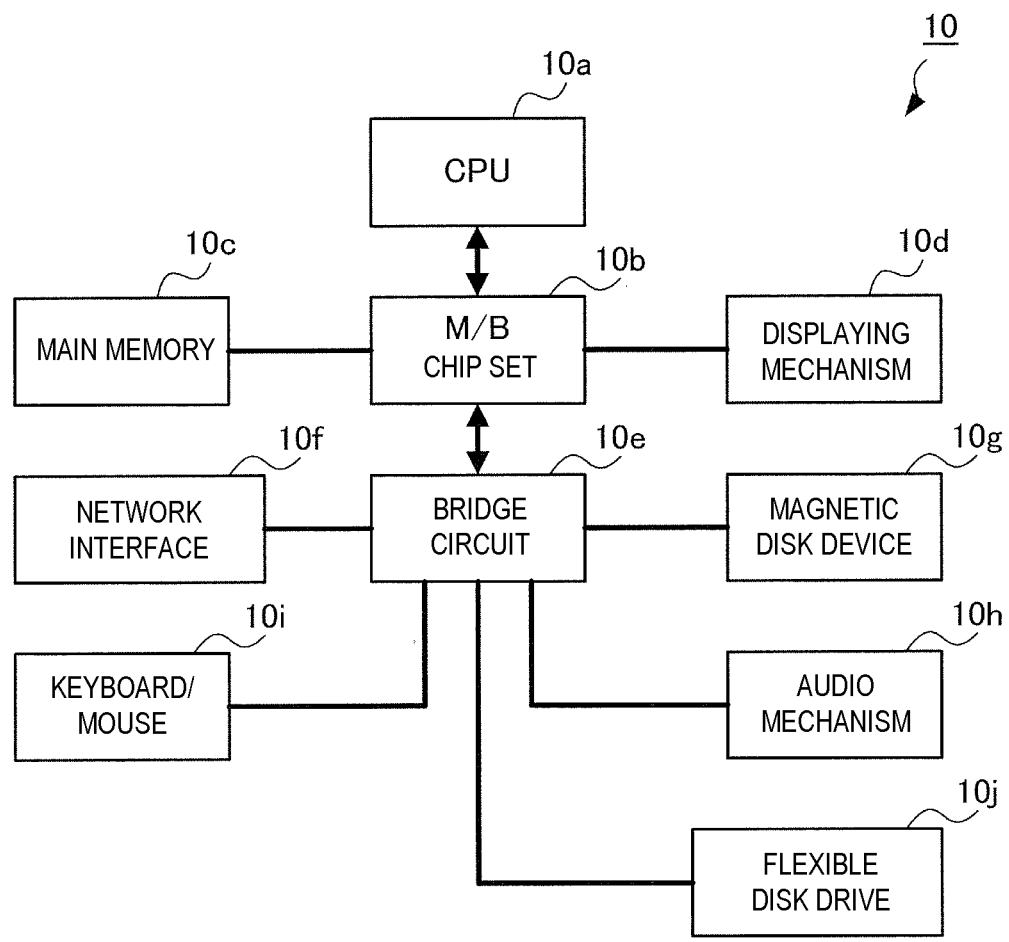
FIG. 1 is a diagram illustrating a hardware configuration example of a computer to which an embodiment of the present invention can be applied.

FIG. 1 is a diagram illustrating a hardware configuration example of a user interface (UI) displaying apparatus 10 in the present embodiment. As illustrated in the figure, the UI displaying apparatus 10 includes: a central processing unit (CPU) 10a that is arithmetic means; a main memory 10c that is connected to the CPU 10a via a mother board (M/B) chip set 10b; and a displaying mechanism 10d that is similarly connected to the CPU 10a via the M/B chip set 10b. Further, a network interface 10f, a magnetic disk device (HDD) 10g, an audio mechanism 10h, a keyboard/mouse 10i, and a flexible disk drive 10j are connected to the M/B chip set 10b via a bridge circuit 10e.

Note that, in FIG. 1, the components are connected via a bus. For example, the CPU 10a and the M/B chip set 10b are connected via a CPU bus, and the M/B chip set 10b and the main memory 10c are connected via a CPU bus. Further, the M/B chip set 10b and the displaying mechanism 10d may be connected via Accelerated Graphics Port (AGP), but, in the case where the displaying mechanism 10d includes a video card compliant with PCI Express, the M/B chip set 10b and this video card are connected via a PCI Express (PCIe) bus. Further, with regard to connection to the bridge circuit 10e, for example, PCI Express can be used for the network interface 10f. Further, for example, Serial ATA (AT attachment), ATA for parallel transfer, and Peripheral Components Interconnect (PCI) can be used for the magnetic disk device 10g. Moreover, Universal Serial Bus (USB) can be used for the keyboard/mouse 10i and the flexible disk drive 10j.

Figure 2:
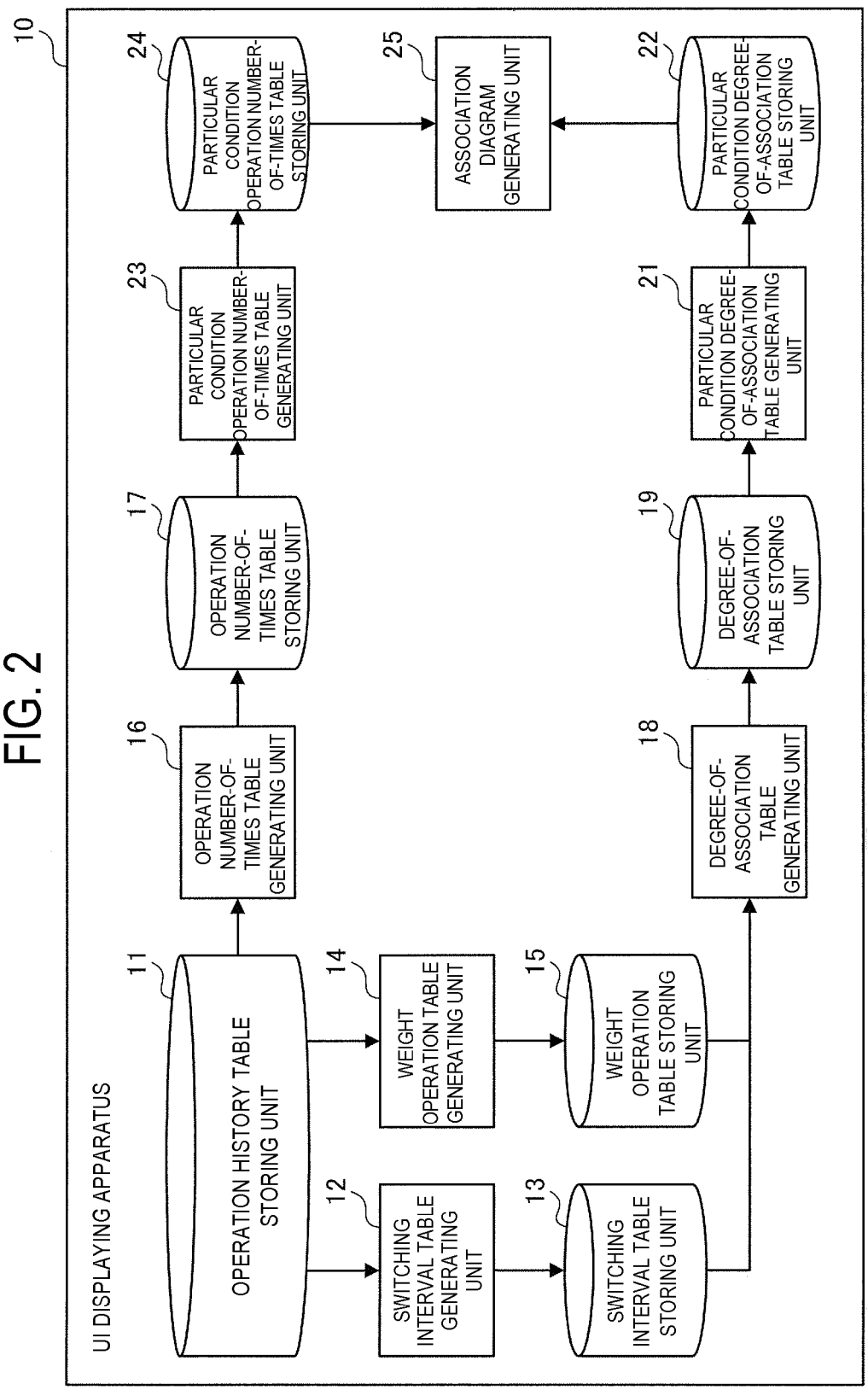
FIG. 2 is a block diagram illustrating a function configuration example of a UI displaying apparatus in the embodiment of the present invention.

FIG. 2 is a block diagram illustrating a function configuration example of the UI displaying apparatus 10 in the present embodiment. As illustrated in the figure, the UI displaying apparatus 10 includes an operation history table storing unit 11, a switching interval table generating unit 12, a switching interval table storing unit 13, a weight operation table generating unit 14, and a weight operation table storing unit 15. The UI displaying apparatus 10 further includes an operation number-of-times table generating unit 16 and an operation number-of-times table storing unit 17. The UI displaying apparatus 10 further includes a degree-of-association table generating unit 18 and a degree-of-association table storing unit 19. The UI displaying apparatus 10 further includes a particular condition degree-of-association table generating unit 21, a particular condition degree-of-association table storing unit 22, a particular condition operation number-of-times table generating unit 23, a particular condition operation number-of-times table storing unit 24, and an association diagram generating unit 25.

The operation history table storing unit 11 stores an operation history table therein. Here, the operation history table, which will be described in detail later, is a table in which an application, an operation event on this application, contents dealt with by this application, and the operation time at which the operation event is performed are associated with one another. Among these elements, the operation event is collected from event information of an operating system (OS). Specifically, if the user performs a mouse operation, a keyboard operation, an application activation operation, and the like on a running application, operation events concerning these operations are collected. In the present embodiment, the operation history table storing unit 11 is provided as an example of a storing unit adapted to store therein an operation history.

The switching interval table generating unit 12 generates a switching interval table including a switching interval between applications on the basis of the operation history table stored in the operation history table storing unit 11. Here, the switching interval may be defined as, for example, the length of time from when a given application is last operated to when another application is first operated. It is determined that the degree of association between the applications is higher as the switching interval therebetween is shorter.

The switching interval table storing unit 13 stores therein the switching interval table generated by the switching interval table generating unit 12. Here, the switching interval table, which will be described in detail later, is a table in which a pair of applications, the switching interval between the applications constituting this pair, and the operation date on which this switching is performed are associated with one another.

The weight operation table generating unit 14 generates a weight operation table including information of an operation serving as the basis for calculating the weight between applications, on the basis of the operation history table stored in the operation history table storing unit 11. Here, examples of such an operation include a copy & paste operation and a cut & paste operation. That is, in the case where a copy & paste operation or a cut & paste operation is performed between given applications, the degree of association between the given applications can be regarded as high, and hence information of such an operation is included in the weight operation table.

The weight operation table storing unit 15 stores therein the weight operation table generated by the weight operation table generating unit 14. Here, the weight operation table, which will be described in detail later, is a table in which a pair of applications, the operation time at which a copy & paste operation or a cut & paste operation is performed between the applications constituting this pair, and the operation date on which such an operation is performed are associated with one another.

The operation number-of-times table generating unit 16 generates an operation number-of-times table including an operation function of each application, on the basis of the operation history table stored in the operation history table storing unit 11.

The operation number-of-times table storing unit 17 stores the operation number-of-times table generated by the operation number-of-times table generating unit 16. Here, the operation number-of-times table, which will be described in detail later, is a table in which an application, the number of times of operation on this application, and the operation date on which the number of times of operation is calculated are associated with one another.

The degree-of-association table generating unit 18 adds the weight concerning the operation included in the weight operation table stored in the weight operation table storing unit 15, to the switching interval included in the switching interval table stored in the switching interval table storing unit 13. In this way, the degree-of-association table generating unit 18 calculates the degree of association for each pair of applications, and generates a degree-of-association table including this degree of association.

The degree-of-association table storing unit 19 stores therein the degree-of-association table generated by the degree-of-association table generating unit 18. Here, the degree-of-association table, which will be described in detail later, is a table in which a pair of applications, the degree of association between the applications constituting this pair, and the operation date on which an operation serving as the basis for calculating the degree of association is performed are associated with one another.

The particular condition degree-of-association table generating unit 21 obtains the degree of association under a particular condition, from the degree of association included in the degree-of association table stored in the degree-of-association table storing unit 19, and generates a particular condition degree-of-association table including the degree of association under this particular condition. Here, a predetermined period, a predetermined day, and the like can be conceived as the particular condition. Among these, examples of the predetermined period include the latest one week, the latest one month, and the latest one year, and the following description is given by taking the latest one week as an example. Further, examples of the predetermined day include a particular day of every week and a particular day of every month, and the following description is given by taking the particular day of every month as an example. In the present embodiment, the particular condition degree-of-association table including the degree of association in the predetermined period is used as an example of first degree-of-association information, and the particular condition degree-of-association table including the degree of association on the predetermined day is used as an example of second degree-of-association information. Further, in the present embodiment, the particular condition degree-of-association table generating unit 21 is provided as an example of a generating unit adapted to generate the first degree-of-association information and the second degree-of-association information.

The particular condition degree-of-association table storing unit 22 stores therein the particular condition degree-of-association table generated by the particular condition degree-of-association table generating unit 21. Here, the particular condition degree-of-association table, which will be described in detail later, is a table in which a pair of applications, the degree of association between the applications constituting this pair, and the operation date on which an operation serving as the basis for calculating the degree of association is performed are associated with one another, similarly to the degree-of-association table.

The particular condition operation number-of-times table generating unit 23 obtains the number of times of operation under a particular condition, from the number of times of operation included in the operation number-of-times table stored in the operation number-of-times table storing unit 17, and generates a particular condition operation number-of-times table including the number of times of operation under this particular condition. It is assumed here that the predetermined period (hereinafter, the latest one week is taken as an example), which is used by the particular condition degree-of-association table generating unit 21, is used as the particular condition. In the present embodiment, the particular condition operation number-of-times table generating unit 23 is provided as an example of an acquiring unit adapted to acquire the number of times of operation.

The particular condition operation number-of-times table storing unit 24 stores therein the particular condition operation number-of-times table generated by the particular condition operation number-of-times table generating unit 23. Here, the particular condition operation number-of-times table is a table in which an application, the number of times of operation on this application, and the operation date on which the number of times of operation is calculated are associated with one another, similarly to the operation number-of-times table.

The association diagram generating unit 25 generates an application association diagram that is a user interface provided by the launcher. Specifically, first, the association diagram generating unit 25 defines an application having the largest number of times of operation as a reference application, with reference to the particular condition operation number-of-times table stored in the particular condition operation number-of-times table storing unit 24, and arranges a reference icon representing this reference application at the center. Further, the association diagram generating unit 25 arranges association icons each representing an association application associated with the reference application such that an association icon representing an association application having a higher degree of association with the reference application is located closer to the center. Then, the association diagram generating unit 25 makes an arrangement having such a hierarchical structure that each association application is sequentially defined as another reference application and that association applications associated with this reference application are arranged. In the present embodiment, the icons are used as an example of a plurality of objects respectively operated at a time of activating applications, and the association diagram generating unit 25 is provided as an example of an arranging unit adapted to arrange the plurality of objects. Here, the association diagram generating unit 25 switches application association diagrams on a date and time basis, in response to an operation on a slider on a screen. For example, an application association diagram including an application activated on only the particular day such as the end of every month and a particular day of every week is displayed in a layer higher than that of an application association diagram including an application activated in the latest one week, and the layers can be switched by the slider. Alternatively, filters such as a day-of-week filter and a date/time filter may be created, and, if a particular day of the week, a particular date and time, or the like is selected, an application association diagram corresponding to the selected day of the week, the selected date and time, or the like may be displayed. In this sense, the association diagram generating unit 25 also corresponds to an example of a receiving unit adapted to receive designation.

Note that these functional units are implemented by cooperation of software and hardware resources. Specifically, the CPU 10a (see FIG. 1) loads programs for implementing the switching interval table generating unit 12, the weight operation table generating unit 14, the operation number-of-times table generating unit 16, the degree-of-association table generating unit 18, the particular condition degree-of-association table generating unit 21, the particular condition operation number-of-times table generating unit 23, and the association diagram generating unit 25, for example, from the magnetic disk device 10g (see FIG. 1) onto the main memory 10c (see FIG. 1), and the CPU 10a (see FIG. 1) thus executes the programs, whereby these functional units are implemented. Further, the operation history table storing unit 11, the switching interval table storing unit 13, the weight operation table storing unit 15, the operation number-of-times table storing unit 17, the degree-of-association table storing unit 19, the particular condition degree-of-association table storing unit 22, and the particular condition operation number-of-times table storing unit 24 are implemented by, for example, the magnetic disk device 10g (see FIG. 1).

Next, a behavior of the UI displaying apparatus 10 in the present embodiment is specifically described.

FIG. 3 is a diagram illustrating an example of the operation history table stored in the operation history table storing unit 11. As a premise for the behavior, it is assumed that such an operation history table is stored in the operation history table storing unit 11. The figure illustrates, for example, that a mouse operation is performed when an application "App1" deals with a content "Content1" at 9:50 and 4 seconds on Monday, Oct. 15, 2012 and that a mouse operation is performed when an application "App2" deals with a content "Content2" at 10:02 and 4 seconds on the same day. The figure also illustrates that a copy operation is performed when the application "App1" deals with the content "Content1" at 12:10 and 4 seconds on the same day and that a paste operation is performed when the application "App2" deals with the content "Content2" at 12:12 and 3 seconds on the same day. The figure also illustrates that a copy operation is performed when the application "App2" deals with the content "Content2" at 13:15 and 5 seconds on the same day and that a paste operation is performed when the application "App1" deals with the content "Content1" at 13:17 and 7 seconds on the same day and when an application "App3" deals with a content "Content3" at 13:21 and 10 seconds on the same day. Note that it is assumed in the figure that portions in which a copy operation and a paste operation are related to each other are omitted and that one mouse operation is performed for one activation of each application, but a plurality of mouse operations may be performed for one activation of each application.

In the state where the operation history table in FIG. 3 is stored in the operation history table storing unit 11 in this way, first, the switching interval table generating unit 12 obtains the switching interval between applications. Then, the switching interval table generating unit 12 generates the switching interval table including this switching interval, and stores the switching interval table into the switching interval table storing unit 13.

FIG. 4 is a diagram illustrating an example of the switching interval table stored in the switching interval table storing unit 13. The figure illustrates, for example, that the switching interval between the application "App1" and the application "App2" is 12 minutes and 0 seconds and that the switching therebetween is performed on Oct. 15, 2012. Note that, in FIG. 3, one mouse operation is performed on the application "App1", and one mouse operation is performed on the application "App2". Hence, in FIG. 4, the interval between the mouse operations that are respectively performed once on the applications is defined as the switching interval between the applications. In actuality, however, as described above, a plurality of mouse operations are performed on the application "App1", and a plurality of mouse operations are performed on the application "App2". Hence, the length of time from the last mouse operation on the application "App1" to the first mouse operation on the application "App2" is defined as the switching interval therebetween.

Further, in the state where the operation history table in FIG. 3 is stored in the operation history table storing unit 11, the weight operation table generating unit 14 obtains the weight concerning an operation between applications. Here, a copy & paste operation or a cut & paste operation is extracted as the operation between the applications. Specifically, the weight operation table generating unit 14 may extract an operation event "Paste" and an operation event "Copy" or an operation event "Cut" prior to the operation event "Paste", from the operation history table stored in the operation history table storing unit 11. Then, the weight operation table generating unit 14 generates the weight operation table including information of this operation, and stores the weight operation table into the weight operation table storing unit 15.

FIG. 5 is a diagram illustrating an example of the weight operation table stored in the weight operation table storing unit 15. The figure illustrates, for example, that a copy & paste operation or a cut & paste operation is performed between the application "App1" and the application "App2" from 12:10 and 4 seconds to 12:12 and 3 seconds on Oct. 15, 2012.

Moreover, in the state where the operation history table in FIG. 3 is stored in the operation history table storing unit 11, the operation number-of-times table generating unit 16 obtains the number of times of operation on each application. Then, the operation number-of-times table generating unit 16 generates the operation number-of-times table including this number of times of operation, and stores the operation number-of-times table into the operation number-of-times table storing unit 17.

FIG. 6 is a diagram illustrating an example of the operation number-of-times table stored in the operation number-of-times table storing unit 17. The figure illustrates, for example, that the number of times of operation on the application "App1" on Oct. 15, 2012 is 156.

Furthermore, in the state where the switching interval table in FIG. 4 is stored in the switching interval table storing unit 13 and where the weight operation table in FIG. 5 is stored in the weight operation table storing unit 15, the degree-of-association table generating unit 18 obtains the degree of association between applications. Here, first, the degree-of-association table generating unit 18 obtains a temporal degree of association that is the degree of association based on the switching interval between applications included in the switching interval table. Specifically, a temporal degree of association AveTimeX,Y between an application "AppX" and an application "AppY" may be set so as to be higher as the switching interval between the application "AppX" and the application "AppY" is shorter. For example, assuming that the switching interval between the application "AppX" and the application "AppY" is a switching interval 1, a switching interval 2, . . . , and a switching interval N, the temporal degree of association may be obtained according to the expression "AveTimeX,Y=(1/switching interval 1+1/switching interval 2+ . . . +1/switching interval N)/N". Next, the degree-of-association table generating unit 18 obtains the degree of association between applications on the basis of this temporal degree of association and the weight concerning an operation included in the operation table. Specifically, assuming that the weight between the application "AppX" and the application "AppY" is WX,Y, a degree of association RX,Y between the application "AppX" and the application "AppY" may be obtained according to the expression "RX,Y=AveTimeX,Y+WX,Y". For example, assuming that a weight point corresponding to one copy & paste operation or one cut & paste operation is 1, the number of times of copy & paste operation or cut & paste operation between the application "AppX" and the application "AppY" may be defined as the weight WX,Y without any change. Then, the degree-of-association table generating unit 18 generates the degree-of-association table including this degree of association, and stores the degree-of-association table into the degree-of-association table storing unit 19.

FIG. 7 is a diagram illustrating an example of the degree-of-association table stored in the degree-of-association table storing unit 19. The figure illustrates, for example, that the degree of association between the application "App1" and the application "App2" is "1.958" on Oct. 15, 2012 and that the degree of association between the application "App1" and the application "App3" is "1.542" on Oct. 15, 2012.

It is assumed that, in the state where the degree-of-association table in FIG. 7 is stored in the degree-of-association table storing unit 19 in this way, the UI displaying apparatus 10 is activated. In that case, the particular condition degree-of-association table generating unit 21 first extracts a portion including the degree of association in the latest one week, from the degree-of-association table stored in the degree-of-association table storing unit 19, and defines the extracted portion as a one-week degree-of-association table.

FIG. 8 is a diagram illustrating an example of the one-week degree-of-association table. The figure illustrates the degree of association between applications in one week from Oct. 15, 2012 to Oct. 21, 2012. The figure illustrates, for example, that the degree of association between the application "App1" and the application "App2" is "1.958" on Oct. 15, 2012 and that the degree of association between the application "App1" and the application "App3" is "1.542" on Oct. 15, 2012. The figure also illustrates, for example, that the degree of association between the application "App1" and the application "App2" is "1.475" on Oct. 16, 2012 and that the degree of association between the application "App1" and the application "App3" is "1.128" on Oct. 16, 2012.

Next, the particular condition degree-of-association table generating unit 21 calculates an average value of the degrees of association between each pair of applications in respective days that are included in the one-week degree-of-association table, and generates a one-week degree-of-association average table including this average value.

FIG. 9 is a diagram illustrating an example of the one-week degree-of-association average table. The figure illustrates, for example, that the degree of association between the application "App1" and the application "App2" is "1.597" in one week starting from Oct. 15, 2012 and that the degree of association between the application "App1" and the application "App3" is "1.170" in one week starting from Oct. 15, 2012.

Subsequently, the particular condition degree-of-association table generating unit 21 selects degrees of association that fall within a preset number of degrees of association ranked high, from among the degrees of association included in the one-week degree-of-association average table, and generates a one-week degree-of-association high ranking table including the selected degrees of association. The following description is given assuming that the degrees of association that fall within the number of degrees of association ranked high are included in the one-week degree-of-association high ranking table, but degrees of association equal to or higher than a preset threshold value may instead be included in the one-week degree-of-association high ranking table. In this case, a condition that a degree of association falls within the number of degrees of association ranked high and a condition that a degree of association is equal to or higher than the threshold value are both an example of a first condition indicating that the degree of association in a predetermined period is high.

FIG. 10 is a diagram illustrating an example of the one-week degree-of-association high ranking table. The figure illustrates, for example, that the degree of association between the application "App1" and the application "App2", which is the highest, is "1.597" and that the degree of association between the application "App1" and the application "App3", which is the second highest, is "1.170". Here, the number of degrees of association ranked high is set to 10. Hence, although the degrees of association up to the tenth highest should be included in the one-week degree-of-association high ranking table, the degrees of association up to the sixth highest are illustrated for convenience of illustration.

In the meantime, in the present embodiment, the application association diagram is generated using not only the degree of association between applications in the latest one week but also the degree of association between applications on a particular day. Note that, because processing is different depending on the relation between the applications used in the latest one week and the applications used on the particular day, this point is first described.

For the first case, description is given of the case where the applications used in the latest one week and the applications used on the particular day are completely different from each other. This is the case, for example, where any of applications A1 to A99 are used in the latest one week and where only applications B1 to B99 are used on the particular day. In this case, a message is outputted to the effect that there is no application associated between the latest one week and the particular day. Note that, in the case where the user can select display of the application association diagram of the particular day and where the user selects the display of the application association diagram of the particular day, the application association diagram of the particular day is displayed.

For the second case, description is given of the case where the applications used in the latest one week and the applications used on the particular day include the same applications. This is the case, for example, where the applications A1 to A99 and B1 to B50 are used in the latest one week, in which the reference application is the application A40, and where the applications A50 to A99 and B1 to B99 are used on the particular day, on which the reference application is the application B50. In this case, the applications used on only the particular day are extracted, the extracted applications are superimposed on the application association diagram of the latest one week, and the resultant application association diagram is displayed. At that time, the applications used on only the particular day are highlighted by, for example, changing their colors or thickening their lines. Further, the applications used on only the particular day are selectively displayed by operating the slider and the like. Note that it is assumed that the reference application on the particular day does not influence the application association diagram of the latest one week.

In the following, taking the second case as an example, description is given of the case where the application association diagram of the particular day is added to the application association diagram of the latest one week and where the resultant application association diagram is displayed. That is, if the day on which the UI displaying apparatus 10 is activated is not the particular day, the particular condition degree-of-association table generating unit 21 stores, as the particular condition degree-of-association table, the one-week degree-of-association high ranking table without any change into the particular condition degree-of-association table storing unit 22. If the day on which the UI displaying apparatus 10 is activated is the particular day, the particular condition degree-of-association table generating unit 21 adds the degree of association on the particular day, to the one-week degree-of-association high ranking table. Specifically, the particular condition degree-of-association table generating unit 21 first extracts a portion including the degree of association on the particular day, from the degree-of-association table stored in the degree-of-association table storing unit 19, and defines the extracted portion as a particular day degree-of-association table (not illustrated). Next, the particular condition degree-of-association table generating unit 21 calculates an average value of the degrees of association between each pair of applications in respective days that are included in the particular day degree-of-association table, and generates a particular day degree-of-association average table (not illustrated) including this average value. Subsequently, the particular condition degree-of-association table generating unit 21 selects degrees of association that fall within a preset number of degrees of association ranked high, from among the degrees of association included in the particular day degree-of-association average table, and generates a particular day degree-of-association high ranking table including the selected degrees of association. The following description is given assuming that the degrees of association that fall within the number of degrees of association ranked high are included in the particular day degree-of-association high ranking table, but degrees of association equal to or higher than a preset threshold value may instead be included in the particular day degree-of-association high ranking table. In this case, a condition that a degree of association falls within the number of degrees of association ranked high and a condition that a degree of association is equal to or higher than the threshold value are both an example of a second condition indicating that the degree of association on a predetermined day is high.

As a result, the particular condition degree-of-association table generating unit 21 extracts an application that is included in the particular day degree-of-association high ranking table and is not included in the one-week degree-of-association high ranking table, adds the degree of association between this application and another application to the one-week degree-of association high ranking table, and defines the resultant table as a degree-of-association high ranking table.

FIG. 11 is a diagram illustrating an example of the degree-of-association high ranking table. The degree-of-association high ranking table includes: a portion including the degrees of association concerning a group of pairs (an example of a first pair group) of applications in the one-week degree-of-association high ranking table; and a portion including the degrees of association concerning a group of pairs (an example of a second pair group) of applications in the particular day degree-of-association high ranking table, and these portions can be discriminated using information stored as an operation date. Of these portions, the former portion is described above with reference to FIG. 10. Hence, description of the former portion is omitted, and only the latter portion is described. That is, the latter portion illustrates, for example, that the degree of association between the application "App1" and the application "App11", which is the highest, is "1.068" and that the degree of association between the application "App2" and the application "App12", which is the second highest, is "0.927". Here, the number of degrees of association ranked high is set to 10. Hence, although the degrees of association up to the tenth highest should be included in the portion included in the particular day degree-of-association high ranking table, the degrees of association up to the third highest are illustrated for convenience of illustration. Note that, if the day on which the UI displaying apparatus 10 is activated is the particular day, the particular condition degree-of-association table generating unit 21 stores, as the particular condition degree-of-association table, this degree-of-association high ranking table into the particular condition degree-of-association table storing unit 22.

Figure 12:
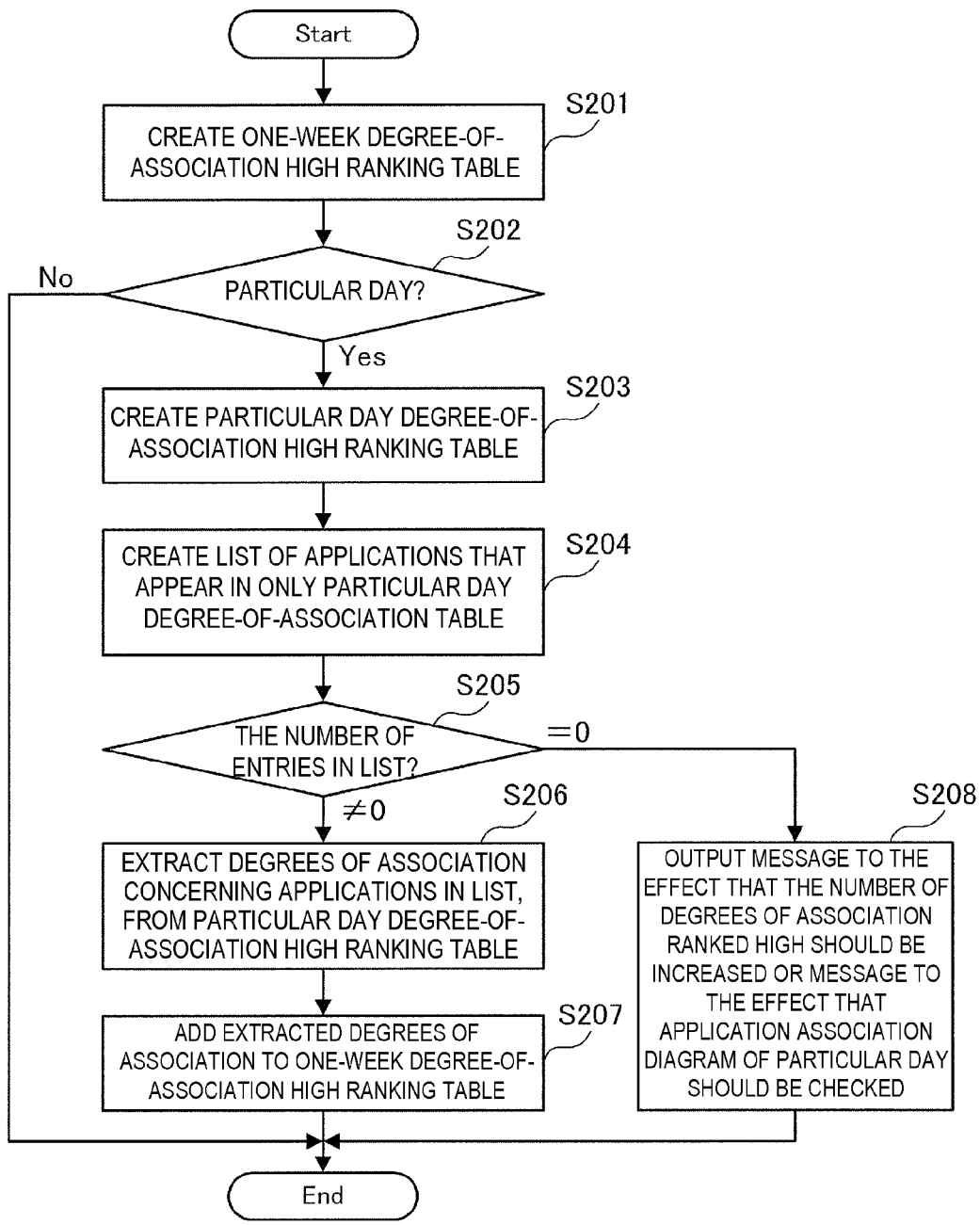
FIG. 12 is a flow chart illustrating a behavior example of a particular condition degree-of association table generating unit in the embodiment of the present invention.

FIG. 12 is a flow chart illustrating a behavior example of the particular condition degree-of association table generating unit 21 configured as described above.

As illustrated in the figure, the particular condition degree-of-association table generating unit 21 first generates the one-week degree-of-association high ranking table (Step 201). Note that a method for generating this one-week degree-of-association high ranking table is described above with reference to FIG. 8 to FIG. 10, and hence description thereof is omitted here.

Next, the particular condition degree-of-association table generating unit 21 determines whether or not the current date is the particular day (Step 202). If it is determined that the current date is not the particular day, the particular condition degree-of-association table generating unit 21 ends the processing. If it is determined that the current date is the particular day, the particular condition degree-of-association table generating unit 21 generates the particular day degree-of-association high ranking table (Step 203). Note that a method for generating this particular day degree-of-association table is similar to that described above with reference to FIG. 8 to FIG. 10, and hence description thereof is omitted here. If the one-week degree-of-association table and the particular day degree-of-association table are generated in this way, the particular condition degree-of-association table generating unit 21 creates an application list of applications that appear in only the particular day degree-of-association table, from among applications that appear in the one-week degree-of-association table and the applications that appear in the particular day degree-of-association table (Step 204).

As a result, the particular condition degree-of-association table generating unit 21 checks the number of application list entries in this application list (Step 205). As a result, if it is determined that the number of entries is not 0, the particular condition degree-of-association table generating unit 21 extracts the degrees of association concerning the applications in the application list, from the particular day degree-of-association high ranking table (Step 206). Then, the particular condition degree-of-association table generating unit 21 adds the degrees of association extracted in Step 206 to the one-week degree-of-association high ranking table such that the degrees of association extracted in Step 206 can be discriminated from the degrees of association originally included in the one-week degree-of-association high ranking table (Step 207). On the other hand, if it is determined in Step 205 that the number of entries in the application list is 0, this means that no application used on the particular day other than the applications used in the latest one week has not been found. Accordingly, in this case, the particular condition degree-of-association table generating unit 21 outputs a message to the effect that the number of degrees of association ranked high should be increased or a message to the effect that the application association diagram of the particular day should be checked (Step 208). Here, in the case where the number of degrees of association ranked high used at the time of generating the one-week degree-of-association table and the number of degrees of association ranked high used at the time of generating the particular day degree-of-association table are set to the same value, the particular condition degree-of-association table generating unit 21 may output a message to the effect that this value should be increased. In the case where the number of degrees of association ranked high used at the time of generating the one-week degree-of-association table and the number of degrees of association ranked high used at the time of generating the particular day degree-of-association table are set to different values, the particular condition degree-of-association table generating unit 21 may output a message to the effect that the latter number of degrees of association ranked high should be increased. Further, in the case where a threshold value for the degree of association is used instead of the number of degrees of association ranked high, the particular condition degree-of-association table generating unit 21 may output a message to the effect that this threshold value should be decreased. In this case, the message to the effect that the number of degrees of association ranked high should be increased and the message to the effect that the threshold value for the degree of association should be decreased are both an example of information to the effect that a condition should be eased. Then, if a user operation for increasing the number of degrees of association ranked high is performed in response to this message, the particular condition degree-of association table generating unit 21 may perform the processing of FIG. 12 using the increased number of degrees of association ranked high.

Meanwhile, if the UI displaying apparatus 10 is activated, the particular condition operation number-of-times table generating unit 23 generates the particular condition operation number-of-times table (not illustrated) including the number of times of operation in the latest one week, on the basis of the operation number-of-times table stored in the operation number-of-times table storing unit 17. Then, the particular condition operation number-of-times table generating unit 23 stores this particular condition operation number-of-times table into the particular condition operation number-of-times table storing unit 24.

If the degree-of-association high ranking table is stored into the particular condition degree-of-association table storing unit 22 and the particular condition operation number-of-times table is stored into the particular condition operation number-of-times table storing unit 24 in this way, a behavior of the association diagram generating unit 25 is started.

Figure 13:
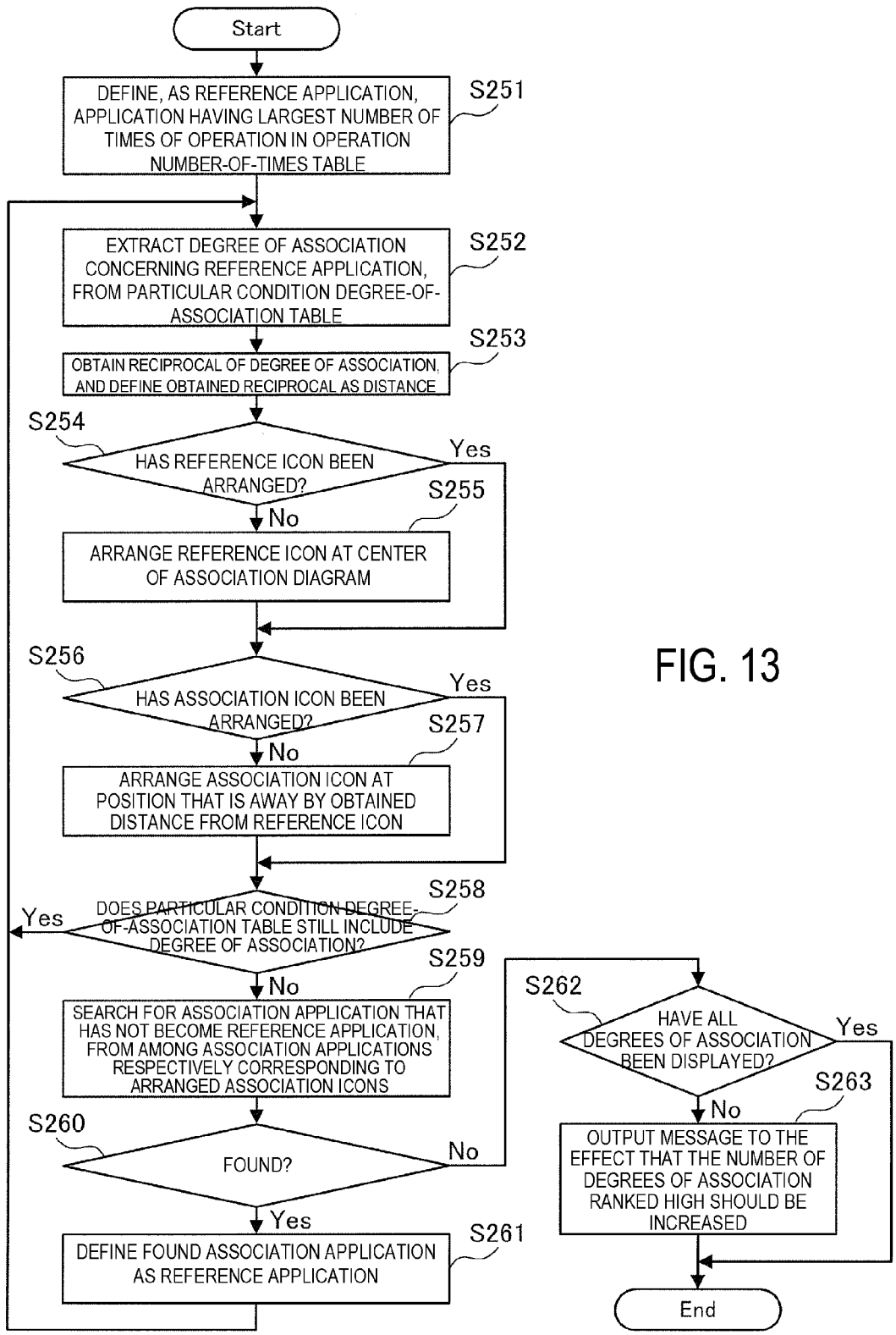
FIG. 13 is a flow chart illustrating a behavior example of an association diagram generating unit in the embodiment of the present invention.

FIG. 13 is a flow chart illustrating a behavior example of the association diagram generating unit 25.

As illustrated in the figure, the association diagram generating unit 25 first determines, as a reference application, an application having the highest frequency of use on the basis of the number of times of operation in the latest one week that is included in the particular condition operation number-of-times table stored in the particular condition operation number-of-times table storing unit 24 (Step 251).

Next, the association diagram generating unit 25 extracts the degree of association between the reference application and an association application associated therewith, from the particular condition degree-of-association table stored in the particular condition degree-of-association table storing unit 22 (Step 252). At that time, if the day on which the UI displaying apparatus 10 is activated is not the particular day, the one-week degree-of-association high ranking table is stored as the particular condition degree-of-association table in the particular condition degree-of-association table storing unit 22, and hence the association diagram generating unit 25 extracts the degree of association from this one-week degree-of-association high ranking table. On the other hand, if the day on which the UI displaying apparatus 10 is activated is the particular day, the degree-of-association high ranking table is stored in the particular condition degree-of-association table storing unit 22. Accordingly, the association diagram generating unit 25 detects a slider operation to determine whether the application association diagram of the latest one week and the particular day is designated or the application association diagram of only the particular day is designated. Then, if the former application association diagram is designated, the association diagram generating unit 25 extracts the degree of association from both of the portion of the one-week degree-of-association high ranking table and the portion of the particular day degree-of-association high ranking table, which are included in the degree-of-association high ranking table. If the latter application association diagram is designated, the association diagram generating unit 25 extracts the degree of association from only the portion of the particular day degree-of-association high ranking table, which is included in the degree-of-association high ranking table.

Subsequently, the association diagram generating unit 25 obtains the reciprocal of the magnitude of the degree of association, and defines the obtained reciprocal as a distance of the association application from the reference application (Step 253). Then, the association diagram generating unit 25 determines whether or not a reference icon representing the reference application has been arranged (Step 254). If the reference icon has not been arranged, the association diagram generating unit 25 arranges the reference icon at the center of the application association diagram (Step 255). If the reference icon has been arranged, the association diagram generating unit 25 does not perform such arrangement of the reference icon. Further, the association diagram generating unit 25 determines whether or not an association icon representing the association application has been arranged (Step 256). If the association icon has not been arranged, the association diagram generating unit 25 arranges the association icon at a position that is away by the distance obtained in Step 254 from the position at which the reference icon is arranged on the application association diagram (Step 257). If the association icon has been arranged, the association diagram generating unit 25 does not perform such arrangement of the association icon.

After that, the association diagram generating unit 25 determines whether or not the particular condition degree-of-association table stored in the particular condition degree-of-association table storing unit 22 still includes the degree of association between the reference application and another association application associated therewith (Step 258). As a result, if it is determined that the particular condition degree-of-association table still includes such a degree of association, the association diagram generating unit 25 repeats the processing of Steps 252 to 257. On the other hand, if it is determined that the particular condition degree-of-association table does not include such a degree of association any more, the association diagram generating unit 25 searches for an association application that has not become a reference application, from among the association applications respectively represented by the arranged association icons (Step 259). Then, the association diagram generating unit 25 determines whether or not such an association application has been found (Step 260).

As a result, if it is determined that such an association application has been found, the association diagram generating unit 25 newly defines the association application as a reference application (Step 261), and repeats the processing of Steps 252 to 260.

On the other hand, if it is determined that such an association application has not been found, the association diagram generating unit 25 determines whether or not all the degrees of association included in the particular condition degree-of-association table have been displayed (Step 262). Then, if it is determined that there is a degree of association that has not been displayed, the association diagram generating unit 25 outputs a message to the effect that the number of degrees of association ranked high should be increased (Step 263). Here, in the case where the number of degrees of association ranked high used at the time of generating the one-week degree-of-association table and the number of degrees of association ranked high used at the time of generating the particular day degree-of-association table are set to the same value, the association diagram generating unit 25 may output a message to the effect that this value should be increased. In the case where the number of degrees of association ranked high used at the time of generating the one-week degree-of-association table and the number of degrees of association ranked high used at the time of generating the particular day degree-of-association table are set to different values, if the degree of association that has not been displayed is a degree of association in the one-week degree-of-association table, the association diagram generating unit 25 may output a message to the effect that the former number of degrees of association ranked high should be increased. On the other hand, if the degree of association that has not been displayed is a degree of association in the particular day degree-of-association table, the association diagram generating unit 25 may output a message to the effect that the latter number of degrees of association ranked high should be increased. Further, in the case where a threshold value for the degree of association is used instead of the number of degrees of association ranked high, the association diagram generating unit 25 may output a message to the effect that this threshold value should be decreased. In this case, the message to the effect that the number of degrees of association ranked high should be increased and the message to the effect that the threshold value for the degree of association should be decreased are both an example of the information to the effect that a condition should be eased. Then, if a user operation for increasing the number of degrees of association ranked high is performed in response to this message, the association diagram generating unit 25 may perform the processing of FIG. 12 and the subsequent figure using the increased number of degrees of association ranked high. As long as such a user operation for increasing the number of degrees of association ranked high is not performed, the association diagram generating unit 25 may continue to display the application association diagram generated this time, without any change.

Further, if it is determined in Step 262 that all the degrees of association included in the particular condition degree-of-association table have been displayed, the association diagram generating unit 25 ends the processing.

Next, a launcher screen using the application association diagram generated in this way is described. Note that it is assumed that the launcher screen described below is displayed by clicking an icon for launcher screen display, the icon being displayed on a desktop after log-in to a personal computer (PC).

Figure 14:
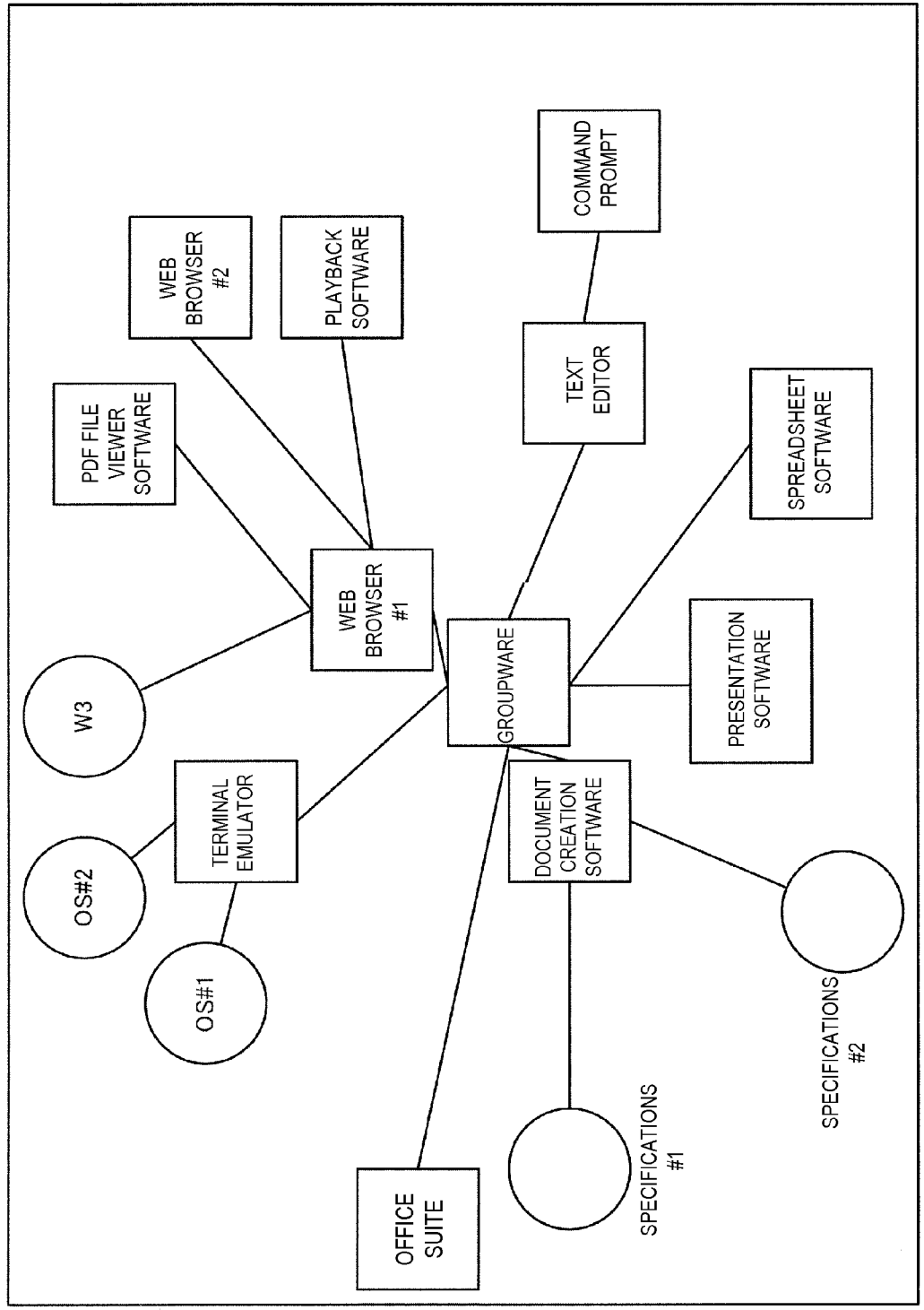
FIG. 14 is a diagram illustrating an example of a launcher screen in the case where a day on which the UI displaying apparatus is activated is not a particular day.

FIG. 14 is a diagram illustrating an example of the launcher screen in the case where the day on which the UI displaying apparatus 10 is activated is not the particular day. It is assumed here that user's work in the latest one week is performed in the following procedures. That is, after coming to his/her office, the user first checks e-mail and a calendar using groupware (for example, Lotus Notes (registered trademark)), and then checks news of his/her company on websites. Next, the user checks necessary specifications names in documents on the groupware, and opens "Specifications #1" and "Specifications #2" to check contents thereof, using document creation software. After that, in order to create a program and carry out a test, the user activates a terminal emulator, and logs in to "OS #1" and "OS #2". Further, the user searches Web Browser #1 for English words and terms in the specifications that the user does not understand. The user makes a note of the search results using a text editor, documents the note as needed, and attaches the documented note to a document on the groupware.

In this case, as illustrated in the figure, an icon of the groupware that is first activated is arranged at the center. Further, an icon of an application to which more frequent transition from the groupware is made is arranged so as to be closer to the groupware. At that time, in addition to the transition, the distance from the groupware is determined considering a history of a copy & paste operation and the like on a document on the groupware. If there is a saved document that is frequently used for each application, such a document is also displayed.

Figure 15:
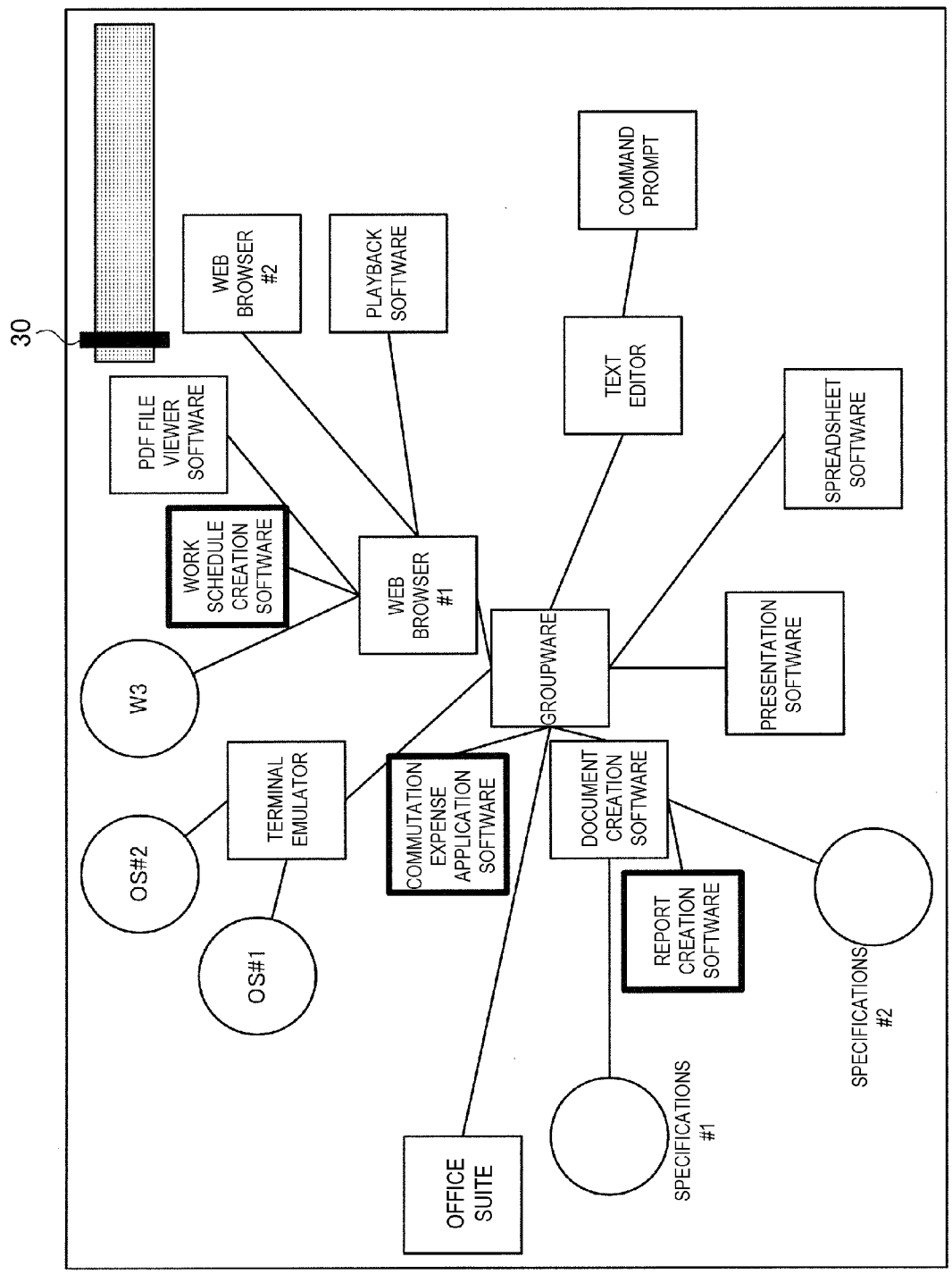
FIG. 15 is a diagram illustrating an example of the launcher screen in the case where the day on which the UI displaying apparatus is activated is the particular day.

FIG. 15 is a diagram illustrating an example of the launcher screen in the case where the day on which the UI displaying apparatus 10 is activated is the particular day. It is assumed here that the particular day is Friday at the end of every month and that a particular application is used on this day. That is, on Friday at the end of every month without fail, the user checks a calendar of the current month to submit a work schedule on the web, and activates software for applying for commutation expenses of the current month to input the commutation expenses thereto, using the groupware. Moreover, the user creates a report of the current month using the document creation software, and submits the report via e-mail of the groupware.

In this case, as illustrated in the figure by surrounding with thick frames, icons of applications that are determined to be necessary on the particular day are each displayed at a position closer to the center. Further, here, a bar 30 of the slider is located at the left end, whereby icons of applications and contents each having a high degree of association in the latest one week with the application arranged at the center of the figure are also displayed. That is, an operation of locating the bar 30 of the slider at the left end is an example of an operation of designating generation of a user interface that is suitable to a predetermined day and is also compatible with a predetermined period.

Figure 16:
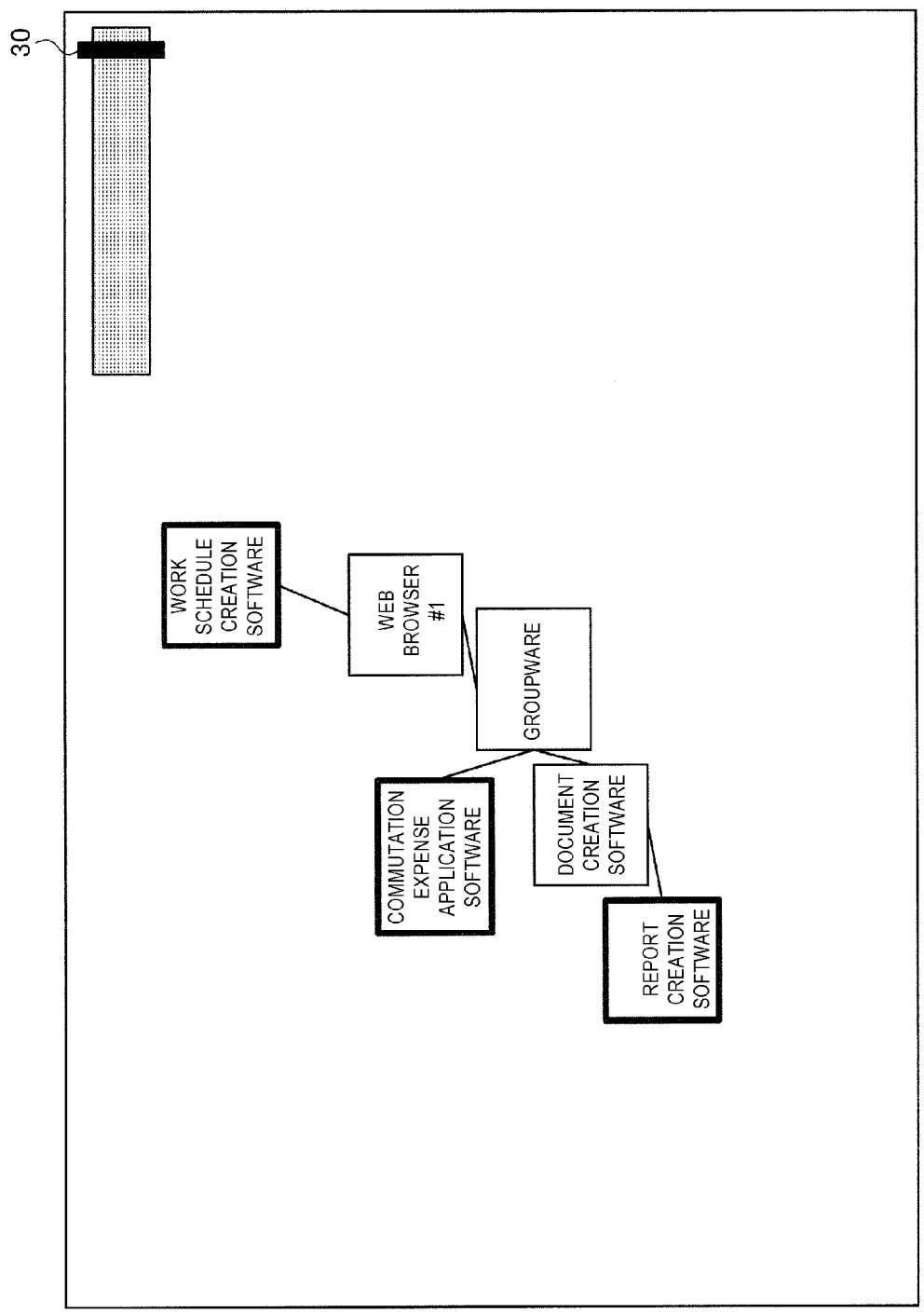
FIG. 16 is a diagram illustrating another example of the launcher screen in the case where the day on which the UI displaying apparatus is activated is the particular day.

FIG. 16 is a diagram illustrating another example of the launcher screen in the case where the day on which the UI displaying apparatus 10 is activated is the particular day. Also in this figure, icons of applications that are determined to be necessary on the particular day are each displayed at a position closer to the center. Note that, unlike FIG. 15, the bar 30 of the slider is located at the right end, whereby only icons of applications each having a high frequency of use on the particular day are displayed. That is, an operation of locating the bar 30 of the slider at the right end is an example of an operation of designating generation of a user interface that is suitable to only a predetermined day.

Note that, if generalized, the present embodiment can be considered to provide a launcher obtained by: preparing at least an application association diagram corresponding to a first period and an application association diagram corresponding to a second period on the basis of a user's operation history on a plurality of applications; and displaying, as a user interface, the application association diagram corresponding to the period designated by the user, of these application association diagrams. In the above description, the first period is assumed as a predetermined period, and the second period is assumed as a predetermined day within this predetermined period, but the first period and the second period may be periods that do not overlap with each other.

Further, in the present embodiment, an application having the largest number of times of operation is defined as the reference application, but the present invention is not limited thereto. More generally, an application that satisfies a predetermined condition indicating that the number of times of operation is large may be defined as the reference application. Alternatively, an arbitrary method may be adopted to determine the reference application, and the reference application may be defined as a predetermined application.

Moreover, in the present embodiment, the reference icon representing the reference application is arranged at the center of the application association diagram, but the present invention is not limited thereto. More generally, the reference icon may be arranged at a position that is determined in advance as a position at which an object first operated by the user is arranged. Alternatively, an arbitrary method may be adopted to determine the position at which the reference icon is arranged, and the position at which the reference icon is arranged may be defined as a predetermined position.

Furthermore, in the present embodiment, the association icon representing each association application having a higher degree of association with the reference application is arranged closer to the reference application, but the present invention is not limited thereto. An arbitrary method may be adopted to determine the position at which the association icon is arranged, and the position at which the association icon is arranged may be defined as a position other than the predetermined position.

As has been described hereinabove, in the present embodiment, because the icons of the applications used in the latest one week are displayed, the application association diagram including icons of applications frequently used in daily work can be displayed. Further, because the number of degrees of association ranked high is changed by a user operation, even in the case where the number of used applications is large, the application association diagram including icons of applications that are highly likely to be used can be displayed. Then, for these reasons, the user can check the association diagram of applications used on a daily basis. Accordingly, the problem that "there are a large number of operations performed by activating similar applications on a daily basis, and hence such operations may be forgotten" can be solved.

Moreover, in the present embodiment, the degrees of association between applications in the latest one week and on the particular day are received as inputs, the applications used on only the particular day are obtained, and the icons of the applications are displayed. Accordingly, the problem that "there are also applications used on only a predetermined day (for example, the end of every month), and hence an operation performed by activating such applications is particularly likely to be forgotten" can be solved.

The present invention has an object to enable designating the degree of association in which period is used at the time of generating a user interface for activating a plurality of applications on the basis of the degree of association among the applications.

In order to achieve such an object, the present invention provides an apparatus for generating a user interface for activating a plurality of applications, the apparatus including: a storing unit adapted to store therein an operation history on the plurality of applications; a generating unit adapted to generate first degree-of-association information indicating a degree of association in a first period among the plurality of applications and second degree-of-association information indicating a degree of association in a second period among the plurality of applications, on a basis of the operation history stored in the storing unit; a receiving unit adapted to receive designation of any of the first period and the second period; and an arranging unit adapted to arrange, in a case where the receiving unit receives the designation of the first period, a plurality of objects respectively operated at a time of activating the plurality of applications, onto the user interface on a basis of the first degree-of-association information, and arrange, in a case where the receiving unit receives the designation of the second period, the plurality of objects onto the user interface on a basis of the second degree-of-association information.

Moreover, the present invention also provides an apparatus for generating a user interface for activating a plurality of applications, the apparatus including: a storing unit adapted to store therein an operation history on the plurality of applications; a generating unit adapted to generate first degree-of-association information indicating a degree of association in a predetermined period among the plurality of applications and second degree-of-association information indicating a degree of association on a predetermined day within the predetermined period among the plurality of applications, on a basis of the operation history stored in the storing unit; a receiving unit adapted to receive any of first designation and second designation in a case of activation on the predetermined day, the first designation designating generation of the user interface that is suitable to the predetermined day and is also compatible with the predetermined period, the second designation designating generation of the user interface that is suitable to only the predetermined day; and an arranging unit adapted to arrange, in a case where the receiving unit receives the first designation, a plurality of objects respectively operated at a time of activating the plurality of applications, onto the user interface on a basis of the first degree-of-association information and the second degree-of-association information, and arrange, in a case where the receiving unit receives the second designation, the plurality of objects onto the user interface on a basis of the second degree-of-association information.

Here, the generating unit may generate the first degree-of-association information, for a first pair group including pairs of applications of the plurality of applications, the pairs of applications satisfying a first condition indicating that the degree of association in the predetermined period is high, and the generating unit may generate the second degree-of-association information, for a second pair group including pairs of applications of the plurality of applications, the pairs of applications satisfying a second condition indicating that the degree of association on the predetermined day is high.

In that case, the generating unit may output information to an effect that the second condition should be eased, in a case where there is not any application that does not constitute any of the pairs of applications included in the first pair group and constitutes any of the pairs of applications included in the second pair group.

Moreover, the arranging unit may arrange an object operated at a time of activating a predetermined application of the plurality of applications, at a predetermined position, and, in a case where a pair of the predetermined application and another application is included in at least any one of the first pair group and the second pair group, the arranging unit may arrange an object operated at a time of activating the another application, at another position.

In that case, the arranging unit may output information to an effect that the second condition should be eased, in a case where an object operated at a time of activating an application constituting any of the pairs of applications included in the second pair group is not arranged.

Moreover, this apparatus may further include an acquiring unit adapted to acquire the number of times of operation on each of the plurality of applications, on the basis of the operation history stored in the storing unit. The arranging unit may arrange an object operated for activating an application that satisfies a predetermined condition indicating that the number of times of operation acquired by the acquiring unit is large, at a position that is determined in advance as a position at which an object first operated by a user is arranged.

Further, the present invention also provides a method for generating a user interface for activating a plurality of applications, the method including the steps of: storing an operation history on the plurality of applications, into a storing unit; generating first degree-of-association information indicating a degree of association in a first period among the plurality of applications and second degree-of-association information indicating a degree of association in a second period among the plurality of applications, on a basis of the operation history stored in the storing unit; receiving designation of any of the first period and the second period; and arranging, in a case where the designation of the first period is received, a plurality of objects respectively operated at a time of activating the plurality of applications, onto the user interface on a basis of the first degree-of-association information, and arranging, in a case where the designation of the second period is received, the plurality of objects onto the user interface on a basis of the second degree-of-association information.

Furthermore, the present invention also provides a method for generating a user interface for activating a plurality of applications, the method including the steps of: storing an operation history on the plurality of applications, into a storing unit; generating first degree-of-association information indicating a degree of association in a predetermined period among the plurality of applications and second degree-of-association information indicating a degree of association on a predetermined day within the predetermined period among the plurality of applications, on a basis of the operation history stored in the storing unit; receiving any of first designation and second designation in a case of activation on the predetermined day, the first designation designating generation of the user interface that is suitable to the predetermined day and is also compatible with the predetermined period, the second designation designating generation of the user interface that is suitable to only the predetermined day; and arranging, in a case where the first designation is received, a plurality of objects respectively operated at a time of activating the plurality of applications, onto the user interface on a basis of the first degree-of-association information and the second degree-of-association information, and arranging, in a case where the second designation is received, the plurality of objects onto the user interface on a basis of the second degree-of-association information.

Further, the present invention also provides a program causing a computer to function as an apparatus for generating a user interface for activating a plurality of applications, the program causing the computer to function as: a storing unit adapted to store therein an operation history on the plurality of applications; a generating unit adapted to generate first degree-of-association information indicating a degree of association in a first period among the plurality of applications and second degree-of-association information indicating a degree of association in a second period among the plurality of applications, on a basis of the operation history stored in the storing unit; a receiving unit adapted to receive designation of any of the first period and the second period; and an arranging unit adapted to arrange, in a case where the receiving unit receives the designation of the first period, a plurality of objects respectively operated at a time of activating the plurality of applications, onto the user interface on a basis of the first degree-of-association information, and arrange, in a case where the receiving unit receives the designation of the second period, the plurality of objects onto the user interface on a basis of the second degree-of-association information.

Furthermore, the present invention also provides a program causing a computer to function as an apparatus for generating a user interface for activating a plurality of applications, the program causing the computer to function as: a storing unit adapted to store therein an operation history on the plurality of applications; a generating unit adapted to generate first degree-of-association information indicating a degree of association in a predetermined period among the plurality of applications and second degree-of-association information indicating a degree of association on a predetermined day within the predetermined period among the plurality of applications, on a basis of the operation history stored in the storing unit; a receiving unit adapted to receive any of first designation and second designation in a case of activation on the predetermined day, the first designation designating generation of the user interface that is suitable to the predetermined day and is also compatible with the predetermined period, the second designation designating generation of the user interface that is suitable to only the predetermined day; and an arranging unit adapted to arrange, in a case where the receiving unit receives the first designation, a plurality of objects respectively operated at a time of activating the plurality of applications, onto the user interface on a basis of the first degree-of-association information and the second degree-of-association information, and arrange, in a case where the receiving unit receives the second designation, the plurality of objects onto the user interface on a basis of the second degree-of-association information.

According to the present invention, it becomes possible to designate the degree of association in which period is used at the time of generating a user interface for activating a plurality of applications on the basis of the degree of association among the applications.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described herein, in one embodiment the present invention enables designating the degree of association in which period is used at the time of generating a user interface for activating a plurality of applications on the basis of the degree of association among the applications.

In one embodiment of the present invention, in a UI displaying apparatus 10, a particular condition degree-of-association table generating unit 21 calculates the degrees of association in the latest one week and on a particular day among applications, on the basis of an operation history stored in an operation history table storing unit 11. An association diagram generating unit 25 arranges a reference application having the largest number of times of operation in the latest one week, at the center. In the case where a user interface that is suitable to the particular day and is also compatible to the latest one week is designated, the association diagram generating unit 25 arranges each association application associated with the reference application on the basis of the degrees of association in the latest one week and on the particular day. In the case where a user interface that is suitable to only the particular day is designated, the association diagram generating unit 25 arranges each association application on the basis of the degree of association on the particular day.

Hereinabove, the present invention has been described by way of the embodiment, but the technical range of the present invention is not limited to the embodiment. It is obvious for a person skilled in the art that various changes and alternative modes can be adopted for the present invention without departing from the spirit and scope thereof.

What is claimed is:

1. An apparatus for generating a user interface for activating a plurality of applications, the apparatus configured to:
store an operation history of the plurality of applications, wherein the operation history of a first application in the plurality of applications includes a record of,
operations executed using the first application,
an indication of data operated on by the first application in response to the execution, and
a time at which the operations were executed;
generate a first data structure having data to indicate a first degree of association between the plurality of applications, the first degree of association determined using switching intervals determined from an operation history of operations executed on the plurality of applications during a first time period;
generate a second data structure having data to indicate a second degree of association between the plurality of applications, the second degree of association determined using an operation history of operations executed on the plurality applications during a second time period;
receive a period indicator indicating a third time period; and
arrange a plurality of objects on the user interface using the first data structure when the period indicator indicates that the third time period is a same time period as the first time period; and
arrange the plurality of objects on the user interface using the second data structure when the period indicator indicates that the third time period is a same time period as the second time period, wherein each object in the plurality of objects activates an application in the plurality of applications.

2. An apparatus for generating a user interface for activating a plurality of applications, the apparatus configured to:
store an operation history of the plurality of applications, wherein the operation history of a first application in the plurality of applications includes a record of
an operation executed using the first application,
an indication of data operated on by the first application in response to execution of the operation, and
a time at which the operation was executed;
generate a first data structure having first data to indicate a first degree of association between the plurality of applications, the first degree of association determined using an operation history of operations executed on the plurality of applications during a first time period, wherein the first time period is determined prior to generating the first degree-of-association;

generate a second data structure having second data to indicate a second degree of association between the plurality of applications, the second degree of association determined using an operation history of operations executed on the plurality applications during a second time period, wherein the second time period is a day within the first time period;

receive, during the second time period, a first indicator and a second indicator, wherein
the first indicator indicates that the user interface should be generated using the first data in the first data structure and the second data in the second data structure, and
the second indicator indicates that the user interface should be generated using the second data included in the second data structure;

arrange, in response to receiving the first indicator, a plurality of objects on the user interface using the first data structures; and arrange, in response to receiving the second indicator, the plurality of objects on the user interface using the second data structure, wherein each object in the plurality of objects is operable to activate an application in the plurality of applications.

3. The apparatus according to claim 2, wherein the apparatus is further configured to:
generate the first data structure having the first data to indicate the first degree of association between applications in a first pair group, the first pair group including at least a first pair of applications selected from the plurality of applications,
wherein a fourth degree of association between a first application and a second application of the first pair of applications during the first time period is higher than a first threshold degree of associations; and
generate the second data structure having the second data to indicate the second degree of association between applications in a second pair group, the second pair group including at least a second pair of applications selected from the plurality of applications,
wherein a fifth degree of association between a third application and a fourth application of the second pair of applications during the second time period is higher than a second threshold degree of association.

4. The apparatus according to claim 3, wherein the apparatus is further configured to:
determine whether the second pair group includes a third pair of applications that is not included in the first pair group; and
generate, in response to determining that the second pair group does not include the third pair of applications, a message indicating that the second threshold level be decreased.

5. The apparatus according to claim 3, wherein the apparatus is further configured to:
arrange a first object operable to activate a predetermined application of the plurality of applications at a predetermined position on the user interface;
determine whether a third pair of applications comprising the predetermined application and a fifth application is included in at least one of the first pair group and the second pair group; and arrange, in response to the determining that the third pair of applications comprising the predetermined application and the fifth application is included in the at least one of the first pair group and the second pair group, a second object operable to activate the fifth application at another position on the user interface.

6. The apparatus according to claim 5, wherein the apparatus is further configured to generate, in response to the determining that the third pair of applications comprising the predetermined application and the fifth application is not included in the at least one of the first pair group and the second pair group, a message indicating that the second threshold level be decreased.

7. The apparatus according to claim 2, wherein the apparatus is further configured to:
acquire, using the stored operation history, a count of a number of times operations are executed using a second application in the plurality of applications;
determine that the count is larger than a threshold value; and
arrange a first object in the plurality of objects operable to activate the second application at a first position, wherein objects arranged at the first position are operated to activate applications before objects arranged at other positions.

8. A computer program product for generating a user interface for activating a plurality of applications, the computer program product comprising a non-transitory computer readable storage medium having program code embodied therewith, the program code readable and executable by a processor to perform a method comprising:
storing an operation history of a plurality of applications, wherein the operation history of a first application in the plurality of applications includes a record of
an operation executed using the first application,
an indication of data operated on by the first application in response to execution of the operation, and
a time at which the operation was executed;
generating a first data structure having first data to indicate a first degree of association between the plurality of applications, the first degree of association determined using an operation history of operations executed on the plurality of applications during a first time period, wherein the first time period is determined prior to generating the first degree-of-association, and
generating a second data structure having second data to indicate a second degree of association between the plurality of applications, the second degree of association determined using an operation history of operations executed on the plurality applications during a second time period, wherein the second time period is a day within the first time period;
receiving, during the second time period, a first indicator and a second indicator, wherein
the first indicator indicates that the user interface should be generated using the first data in the first data structure and the second data in the second data structure, and
the second indicator indicates that the user interface should be generated using the second data included in the second data structure;
arranging, in response to receiving the first indicator, a plurality of objects on the user interface using the first data structure; and
arranging, in response to receiving the second indicator, the plurality of objects on the user interface using the second data structure, wherein each object in the plurality of objects is operable to activate an application in the plurality of applications.

9. The computer program product of claim 8, wherein the method further comprises:
    generating the first data structure having the first data to indicate the first degree of association between applications in a first pair group, the first pair group including at least a first pair of applications selected from the plurality of applications,
        wherein a fourth degree of association between a first application and a second application of the first pair of applications during the first time period is higher than a first threshold degree of association, and
    generating the second data structure having the second data to indicate the second degree of association between applications in a second pair group, the second pair group including at least a second pair of applications selected from the plurality of applications,
        wherein a fifth degree of association between a third application and a fourth application of the second pair of applications during the second time period is higher than a second threshold degree of association.

10. The computer program product of claim 9, wherein the method further comprises:
    arranging a first object to activate a predetermined application of the plurality of applications at a predetermined position on the user interface;
    determining whether a third pair of applications comprising the predetermined application and a fifth application is included in at least one of the first pair group and the second pair group; and
    arranging, in response to the determining that the third pair of applications comprising the predetermined application and the fifth application is included in at least one of the first pair group and the second pair group, a second object operable to activate the fifth application at another position on the user interface.

11. The computer program product of claim 8, wherein the method further comprises:
    acquiring, using the stored operation history, a count of a number of times operations are executed using a second application in the plurality of applications; and
    wherein the arranging comprises
    determining that the count is larger than a threshold value, and
    arranging a first object in the plurality of objects operable to activate the second application at a first position, wherein objects arranged at the first position are operated to activate applications before objects arranged at other positions.

* * * * *